United States Patent Office 3,502,870
Patented Mar. 24, 1970

3,502,870
APPARATUS FOR SIMULTANEOUSLY DISPLAYING A PLURALITY OF IMAGES OF AN OBJECT BEING ANALYZED IN AN ELECTRON BEAM DEVICE
Tatsuo Fujiyasu, Koichi Hara, and Masahiro Gotou, Ibaraki, and Takashi Nagatani, Nagoya, Japan, assignors to Hitachi, Ltd., Chujody-ku, Tokyo, Japan, a corporation of Japan
Filed July 5, 1968, Ser. No. 742,894
Claims priority, application Japan, July 5, 1967, 42/42,790, 42/42,792
Int. Cl. H01j 37/26
U.S. Cl. 250—49.5                                23 Claims

ABSTRACT OF THE DISCLOSURE

A device for displaying a plurality of images of an object in which two regions of the specimen are alternately scanned by an electron beam so as to derive two informations from the specimen in synchronism with the alternate scanning, and these two informations are alternately introduced into two cathode-ray tubes as a brightness modulation signal so as to independently and simultaneously display two differently magnified images of the object on these two cathode-ray tubes.

BACKGROUND OF THE INVENTION

Field of the invention

This invention relates to a device for displaying images of an object, and more particularly to an image display device of the kind in which an irradiating beam is directed toward an object for scanning it in a two-dimensional fashion and the information thereby derived from the object is led to a display means for the display of the images of the object thereon.

DESCRIPTION OF THE PRIOR ART

Scanning electron microscopes, scanning electron probe X-ray microanalysers or like analysers generally employ an image display device in which an irradiating beam is directed toward an object, or in a more limited sense, a specimen to be analysed so as to scan the specimen in a two-dimensional fashion and the information in the form of X-rays, secondary electrons, reflected electrons, absorption electrons or the like thereby derived from the specimen is fed to an image display means for the display of the image of the object or specimen thereon. Recently, however, there is a strong demand for the development of a device of this kind which is capable of deriving a plurality of informations from an object, and on the basis of the informations thus derived, simultaneously displaying a plurality of images of the object with different magnifications.

SUMMARY OF THE INVENTION

It is therefore an object of the present invention to provide a novel and useful image display device which satisfies fully the above demand.

Another object of the present invention is to provide an image display device which is capable of deriving a plurality of informations of the same nature from an object, and on the basis of the informations thus derived, simultaneously displaying a plurality of images of the object with different magnifications at different regions on a single cathode-ray tube.

A further object of the present invention is to provide an image display device which is capable of deriving a plurality of informations of the same nature from an object, and on the basis of the informations thus derived, simultaneously displaying a plurality of images of the object with different magnifications on a plurality of cathode-ray tubes.

A still further object of the present invention is to provide an image display device which is capable of deriving a plurality of informations of a different nature from an object, and on the basis of the informations thus derived, simultaneously displaying a plurality of images of the object with different magnifications at different regions on a single cathode-ray tube.

A still further object of the present invention is to provide an image display device which is provided with a plurality of cathode-ray tubes and is capable of deriving a plurality of informations of a different nature from an object, and on the basis of the informations thus derived, simultaneously displaying a plurality of images of a different nature of the object at different regions on the cathode-ray tubes, and in which the images of the object displayed on any one of the cathode-ray tubes have a magnification different from that of the images of the object displayed on the remaining cathode-ray tubes.

In accordance with one aspect of the present invention, there is provided a device for displaying a plurality of images of an object comprising means for directing an irradiating beam toward the object for scanning the object across a plurality of regions of varying areas thereof at a predetermined time interval, the largest region substantially including all other regions, thereby deriving from said regions a plurality of informations which are at least as many as said regions, means for detecting said informations, display means of the cathode-ray tube type operative by receiving said detected informations to display a plurality of images of the object, and control means for controlling the display operation so that the images of the object are displayed at different regions of said display means.

Other objects, features and advantages of the present invention will be apparent from the following description when taken in conjunction with the accompanying drawings.

DESCRIPTION OF THE PREFERRED EMBODIMENTS

Figure 1:
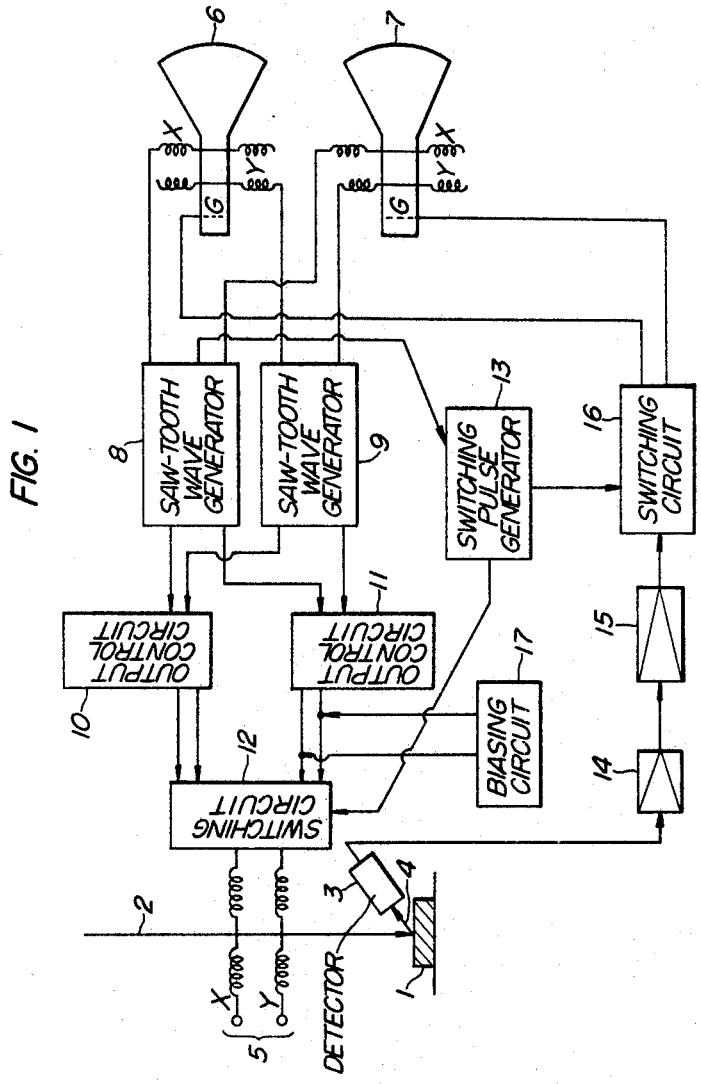
FIG. 1 is a block diagram of an embodiment of the image display device according to the present invention.

Referring to FIG. 1, an object 1 or a specimen to be analysed is irradiated with an irradiating beam 2 which may be a beam of electrons. When the object 1 is so irradiated with the irradiating beam 2, an information 4 which may be in the form of X-rays is derived from the object 1 and is detected by a detector 3. For the two-dimensional scanning of the object 1 with the irradiating beam 2, there is provided a deflecting coil assembly 5 which includes horizontal deflecting coils X and vertical deflecting coils Y. Display means in this embodiment comprises two cathode-ray tubes 6 and 7. A saw-tooth wave generator 8 for the horizontal deflection and a saw-tooth wave generator 9 for the vertical deflection are provided so that the output from the former can be supplied to the horizontal deflecting coils of the cathode-ray tubes 6 and 7, while the output from the latter can be supplied to the vertical deflecting coils of the cathode-ray tubes 6 and 7. Both the outputs from the saw-tooth wave generators 8 and 9 are further applied to output control circuits 10 and 11, the outputs from which are supplied to a switching circuit 12. The switching circuit 12 is operative to alternately switch over the outputs from the output control circuits 10 and 11 so that these outputs can alternately and repeatedly be applied to the respective horizontal and vertical deflecting coils of the deflecting coil assembly 5. The operation of the switching circuit 12 is controlled by a train of pulses generated by a switching pulse generator 13 which is designed to generate pulses of the same frequency as that of the saw-tooth wave generated by the saw-tooth wave generator 8 for the horizontal deflection. A pre-amplifier 14 and a main amplifier 15 amplify the information 4 in the form of the X-rays detected by the detector 3 so as to supply the detector output through a switching circuit 16 to the grids G of the cathode-ray tubes 6 and 7 as a brightness modulating signal. The switching circuit 16 is operated in synchronous relation with the switching circuit 12 under control of the switching pulse generator 13 so as to alternately and repeatedly supply the output from the detector 3 to the grids G of the cathode-ray tubes 6 and 7. A biasing circuit 17 is provided to suitably apply a biasing control to the output from the output control circuit 11.

In the image display device having such a structure, the saw-tooth wave generator 8 for the horizontal deflection and the saw-tooth wave generator 9 for the vertical deflection are first placed in operation, and the output control circuits 10 and 11 are so regulated that these circuits deliver outputs of different magnitude. These outputs of different magnitude are alternately and repeatedly supplied through the switching circuit 12 to the deflecting coil assembly 5, which therefore deflects the irradiating beam 2 depending on the relative magnitude of these two outputs so that the irradiating beam 2 scans repeatedly over the object 1 at two regions of different areas. In the meantime, the X-rays 4 are generated from the object 1 when the latter is irradiated with the irradiating beam 2, and the X-rays 4 are detected by the detector 3, amplified by the amplifiers 14 and 15, and are then supplied through the switching circuit 16 to the grids G of the cathode-ray tubes 6 and 7 as brightness modulating signals. In this connection, it will be noted that, since the irradiating beams 2 scan repeatedly over the surface of the object 1 at two regions of different areas, two different informations are produced from these two regions and are supplied to the switching circuit 16. It will be further noted that the switching circuit 16 is operated in synchronous relation with the switching circuit 12 under control of the pulses supplied from the switching pulse generator 13, which is actuated by the horizontal deflection saw-tooth wave generator 8, so as to alternately and repeatedly supply the output from the detector 3 to the grids G of the cathode-ray tubes 6 and 7. Accordingly, two images of the object 1 with different magnifications representing the corresponding X-ray informations are simultaneously displayed on the respective cathode-ray tubes 6 and 7.

When therefore the two scanned regions on the surface of the object 1 are arranged to have predetermined different areas as described above, an X-ray image of the object with a low magnification is displayed on one of the cathode-ray tubes 6 and 7, while at the same time, an X-ray image of the object which represents a magnified image of a part of the low-magnification image of the object is displayed on the other cathode-ray tube. Furthermore, the biasing circuit 17 may suitably be controlled to regulate the biasing component (D.C. component) in the output from the output control circuit 11 so as to vary the scanning position of the irradiating beam 2 which is dependent upon the output from the output control circuit 11. It is thus possible to display a low-magnification image of the object on one of the cathode-ray tubes 6 and 7 and to display a magnified image representing a part of the low-magnification image of the object on the other cathode-ray tube. A biasing circuit (not shown) may additionally be disposed between the switching circuit 12 and the output control circuit 10. In such a case, it is possible, of course, to bias the output from the output control circit 10 thereby to vary correspondingly the scanning position of the irradiating beam 2.

In the above embodiment, X-rays are utilized as a brightness modulating signal to be supplied to the grids G of the cathode-ray tubes 6 and 7. However, the information derived from the object 1 is not solely obtained in the form of the X-rays but also is received in the form of secondary electrons, reflected electrons, absorbed electrons and the like, and therefore they may be utilized as the brightness modulating signal. Furthermore, in lieu of the irradiated arrangement in which the switching pulse generator 13 is adapted to be actuated by the output from the horizontal deflection saw-tooth wave generator 8, the switching pulse generator 13 may be arranged to be actuated by the output from the vertical deflection saw-tooth wave generator 9. Moreover, in lieu of the illustrated example in which signals of a single kind detected from the object 1 are represented as two images of the object with different magnifications and such images are simultaneously displayed on the two cathode-ray tubes 6 and 7, the image display device may include three or more output control circuits whereby the regions scanned by the irradiating beam 2 can be switched over in three or more stages. In such a case, three or more cathode-ray tubes are provided so that signals of a single kind detected from the object 1 are represented as three or more images of the object with different magnifications and such images can simultaneously be displayed on these cathode-ray tubes.

Figure 2:
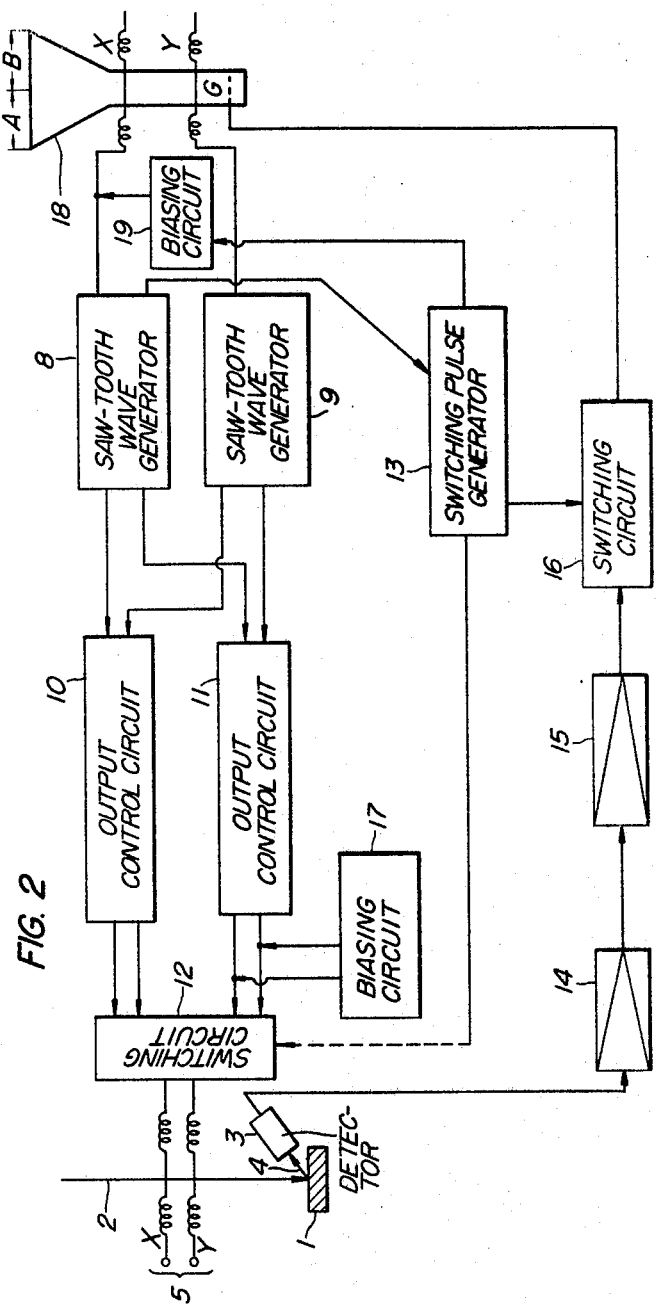
FIGS. 2 to 5 are block diagrams of various modifications of the image display device according to the present invention.

FIG. 2 shows another embodiment of the image display device according to the present invention. The device shown in FIG. 2 differs from the device shown in FIG. 1 in that it employs a single cathode-ray tube 18 as the display means and intends to simultaneously display two images of the object at two different regions on the cathode-ray tube 18. In FIG. 2, like reference numerals are used to denote like parts appearing in FIG. 1 for the sake of ready comparison therebetween.

The image display device shown in FIG. 2 comprises a biasing circuit 19 disposed between a horizontal deflection saw-tooth wave generator 8 and the horizontal deflecting coils of the cathode-ray tube 18 so that two biasing voltages of different magnitudes can thereby be alternately and repeatedly superposed on the output voltage applied from the horizontal deflection saw-tooth wave generator 8 to the horizontal deflecting coils of the cathode-ray tube 18 in synchronism with the operation of switching circuits 12 and 16. As a result, the electron beam (not shown) emitted from the electron gun (not shown) of the cathode-ray tube 18 scans alternately and repeatedly the left-hand half A and the right-hand half B of the screen of the cathode-ray tube 18. According to such an arrangement, two images of an object with different magnifications as those obtained by the system shown in FIG. 1 can simultaneously be displayed on the left-hand half A and the right-hand half B of the screen of the cathode-ray tube 18. It will be appreciated that the device shown in FIG. 2 has a simplified structure compared with the device shown in FIG. 1 and the two differently magnified images of an object can easily be observed on a single cathode-ray tube for the ready comparison therebetween.

Figure 3:
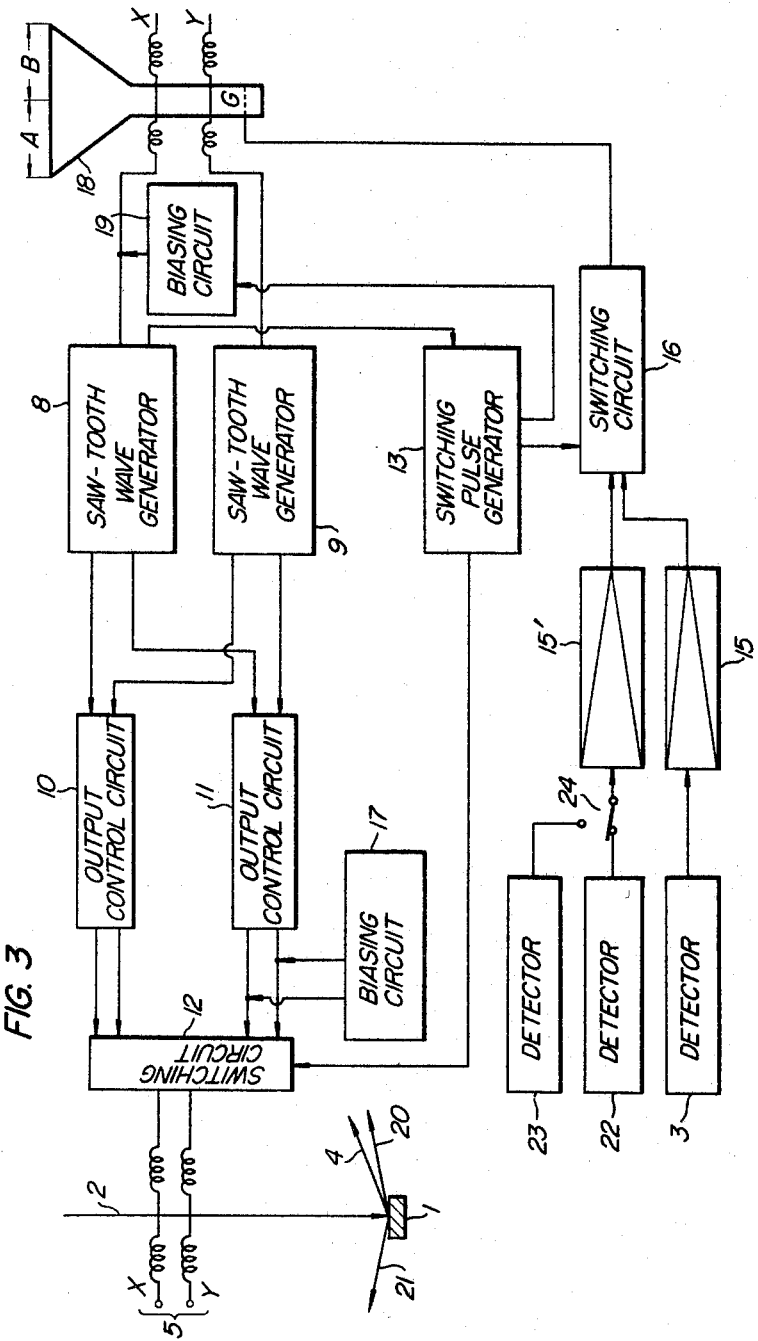

FIG. 3 shows a further embodiment of the present invention, in which like reference numerals are used to denote like parts appearing in FIG. 2. The image display device shown in FIG. 3 differs from the device shown in FIG. 2 in that it comprises additional means including detectors 22 and 23 for detecting secondary electrons 20 and reflected electrons 21, respectively, which are informations of different nature derived from an object 1, an amplifier 15′ connected to the input side of a switching circuit 16, and an electrical switch 24 for selectively connecting one of the detectors 22 and 23 with the amplifier 15' as required.

In FIG. 3, the detector 22 for detecting the secondary electrons 20 is shown as connected with the amplifier 15' by the electrical switch 24. Inasmuch as other components of the device of FIG. 3 are the same as those in device of FIG. 2, it is apparent that an image representing the information in the form of X-rays 4 derived from the object 1 is displayed on either the left-hand half A, the right-hand half B of the screen of a cathode-ray tube 18, while at the same time, an image representing the information in the form of secondary electrons 20 derived from the object 1 is displayed on the other half of the screen of the cathode-ray tube 18, and these two images have different magnifications. When the electrical switch 24 is turned to the position at which the detector 23 for detecting the reflected electrons 21 is connected with the amplifier 15', the intensity modulation is then alternately effected by the X-rays 4 and the reflected electrons 21. It is therefore apparent that an image representing the X-rays derived from the object 1 and an image representing the refllected electrons 21 derived from the object 1 are simultaneously displayed on the screen of the cathode-ray tube 18 and these two images have different magnifications.

Figure 4:
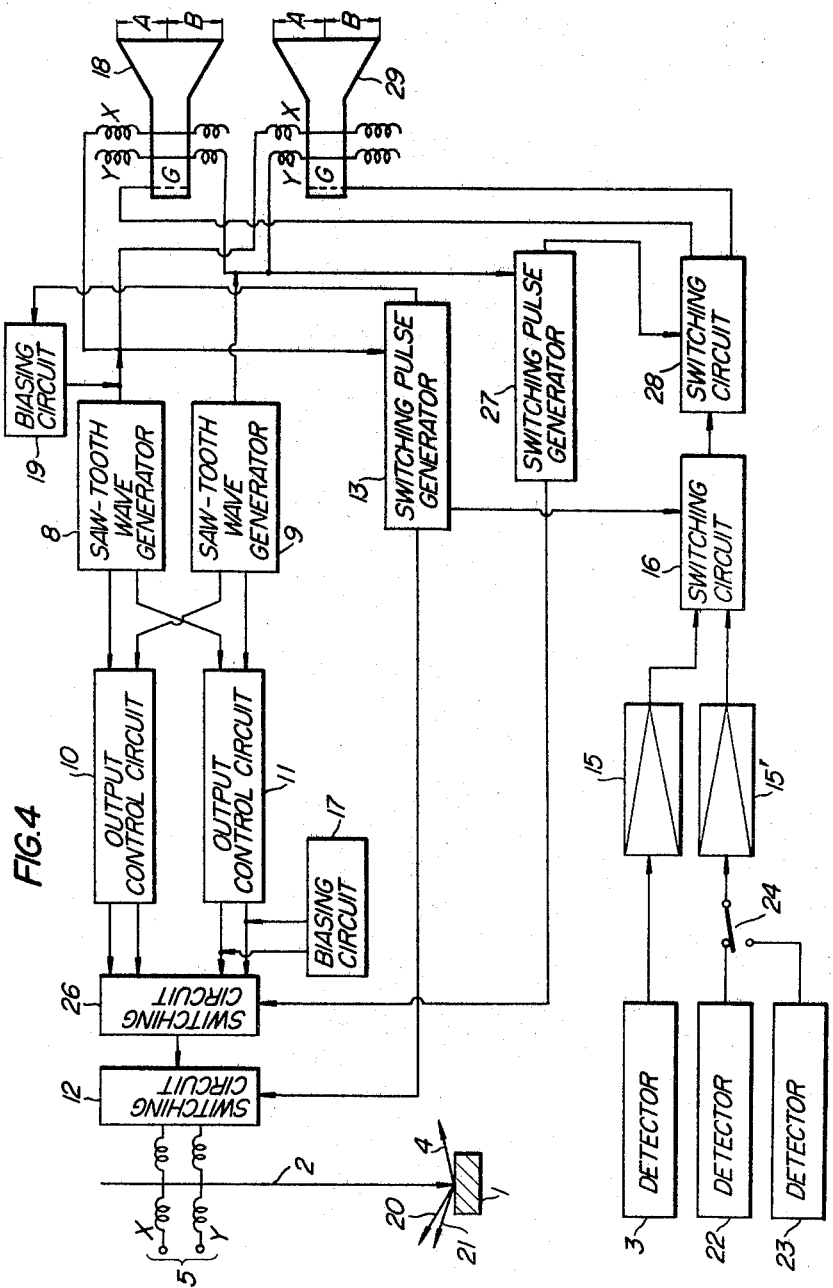

FIG. 4 shows a still further embodiment of the present invention, in which like reference numerals are used to denote parts appearing in FIG. 3. The image display device shown in FIG. 4 differs from the device shown in FIG. 3 in that it comprises additional means including another switching circuit 26 which is disposed between a switching circuit 12 and output control circuits 10 and 11 and is adapted to be operated by a switching pulse generator 27 which generates pulses depending on the output from a vertical deflection saw-tooth wave generator 9, another switching circuit 28 disposed after a switching circuit 16 so as to be operated by the switching pulse generator 27 in synchronous relation with the switching circuit 26, and another cathode-ray tube 29.

The embodiment shown in FIG. 4 operates in the following manner. The switching circuit 26 is operative to apply the outputs from the output control circuits 10 and 11 to the switching circuit 12 at a period which is the same as the period of the saw-tooth wave generated by the vertical deflection saw-tooth wave generator 9, while the switching circuit 12 is operative to apply the respective outputs from the switching circuit 26 to a deflecting coil assembly 5 at a period which is the same as the period of the saw-tooth wave generated by a horizontal deflection saw-tooth wave generator 8. Signals coming from a detector 3 for detecting X-rays 4 and from a detector 22 for detecting secondary electrons 20 are led through respective amplifiers 15 and 15' to the switching circuit 16, from which these signals are taken out at a period which is the same as the period of the saw-tooth wave generated by the horizontal deflection saw-tooth wave generator 8 to be led into the switching circuit 28. Each output delivered from the switching circuit 28 has a period which is the same as the period of the saw-tooth wave generated by the vertical deflection saw-tooth wave generator 9 and is led to the grid G of the cathode-ray tube 18 or to the grid G of the cathode-ray tube 29. Therefore, an image representing the X-rays 4 derived from the object 1 is displayed on a portion A (or a portion B) of the screen of one of the cathode-ray tubes 18 and 29, while at the same time, an image representing the secondary electrons 20 derived from the object 1 is displayed on the portion B (or the portion A) of the same cathode-ray tube, and a magnified image of a part of the X-ray image of the object 1 is displayed on a portion A (or a portion B) of the screen of the other cathode-ray tube, while at the same time, a magnified image of a part of the secondary electron image of the object 1 is displayed on the portion B (or the portion A) of the same cathode-ray tube. Needless to say that, when an electrical switch 24 is turned to the position at which a detector 23 for reflected electrons 21 is connected with the amplifier 15', an X-ray image and a reflected electron image of the object 1 can simultaneously be displayed on either of the portions A and B of the screen of one of the cathode-ray tubes 18 and 29, while a magnified image of a part of the X-ray image and a magnified image of a part of the reflected electron image of the object 1 can simultaneously be displayed on either of the portions A and B of the screen of the other cathode-ray tube.

Figure 5:
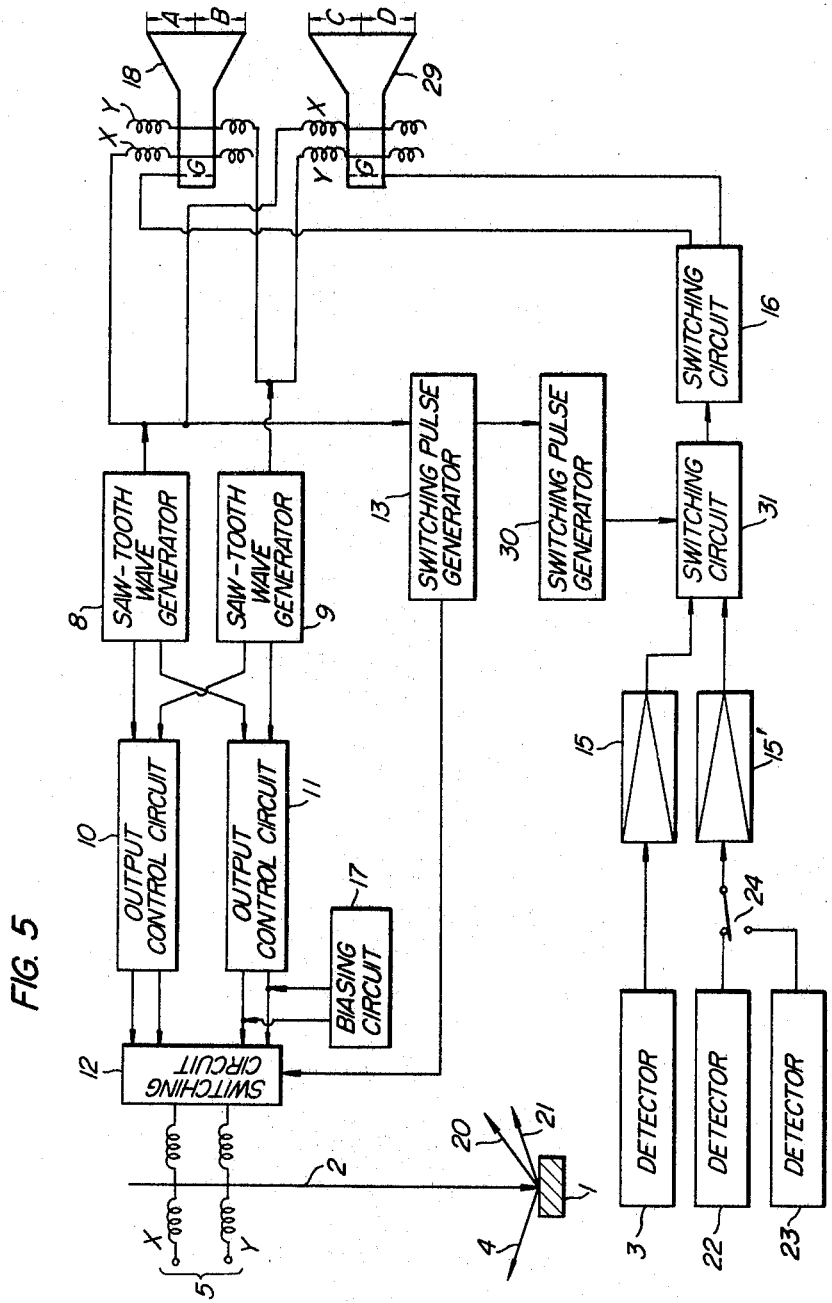

FIG. 5 shows a yet further embodiment of the present invention, in which like reference numerals are used to denote like parts appearing in FIG. 4. The image display device shown in FIG. 5 differs from the device shown in FIG. 4 in that it is equipped neither with switching circuit 26 nor with the switching pulse generator 27 in FIG. 4 but it is additionally provided with a switching pulse generator 30 which generates pulses of a frequency two times the frequency of pulses generated by a pulse generator 13, and with a switching circuit 31 adapted to be actuated by the switching pulse generator 30.

In the image display device shown in FIG. 5, a switching circuit 12 is operative to apply the outputs from output control circuits 10 and 11 to a deflecting coil assembly 5 at a frequency which is the same as the frequency of the saw-tooth wave generated by a horizontal deflection saw-tooth wave generator 8, while the switching circuit 31 is operative to apply the outputs from detectors 3 and 22 to a switching circuit 16 at a frequency which is two times the frequency of the saw-tooth wave generated by the horizontal deflection saw-tooth wave generator 8. The switching circuit 16 is operative to apply these signals to the grids G of cathode-ray tubes 18 and 29 at a frequency which is the same as the frequency of the saw-tooth wave generated by the horizontal deflection saw-tooth wave generator 8. Further, a biasing circuit 17 is operative to freely vary the position of the scanned region which is under control of the output from the output control circuit 11. Therefore, an X-ray image and a secondary electron image of an object 1 can simultaneously be displayed on either of portions A or B of the screen of one of the cathode-ray tubes 18 and 29, while at the same time, similar images one of which is a magnified image of a part of the X-ray image or the secondary electron image of the object 1 can simultaneously be displayed on either of the portions C or D of the other cathode-ray tube.

Although the present invention has been described with reference to FIGS. 1 to 5 in regard to its specific application to a scanning electron microscope by way of example, it will be readily understood that the present invention is also applicable to an electron probe X-ray microanalyser and the like.

A known electron microscope is designed to operate to form an electrical charge image of a specimen on a target, to irradiate the target with an irradiating beam (low-speed electron beam) while moving the irradiating beam in a two-dimensional fashion in synchronous relation with the emission (electron beam) produced in a cathode-ray tube, to detect a discharge signal representing the electrical charge image of the specimen delivered from the target in response to the irradiation and scanning, and to effect the brightness modulation utilizing the detected signal thereby to display the image of the specimen on the cathode-ray tube. The electron microscope of this kind is commonly called an electron microscope of the television type.

The present invention is also applicable to such a type of electron microscope. It is to be understood therefore that the term "object" used in the description of the present invention designates the specimen itself in the scanning electron microscope, electron probe X-ray microanalyser and the like, while the same term also designates the electrical charge image of a specimen in the electron microscope of the television type described above, and thus this term should not strictly be interpreted in a narrow sense. Throughout FIGS. 1 to 5, any detailed description as to the structure of the unit components of the device is omitted since these components per se may be conventional ones.

The embodiments shown in FIGS. 1 to 5 are merely given to illustrate the present invention and are not intended to limit the present invention in any way, and many changes and modifications may be made therein without departing from the spirit of the present invention.

What is claimed is:

1. A device for displaying a plurality of images of an object comprising means for directing an irradiating electron beam toward the object deflection means for sequentially scanning the beam over a plurality of individual regions of varying areas on the object in a predetermined time interval, thereby alternately deriving from said plural regions a plurality of respective informations which are at least as numerous as said regions, means for detecting said informations, display means of the cathode-ray tube type operative by receiving said detected informations to display a plurality of respective images of the object, and control means for controlling the display operation so that the respective images of the object are simultaneously displayed at different regions of said display means.

2. A device according to claim 1, in which the number of said scanned regions is two, said display means includes two cathode-ray tubes, and the number of said informations is two, one of said informations being utilized as a brightness modulation signal for one of said cathode-ray tubes while the other being utilized as a brightness modulation signal for the other said cathode-ray tube.

3. A device according to claim 1, in which the number of said scanned regions is two, said display means includes a single cathode-ray tube, and the number of said informations is two, both said informations being alternately utilized as a brightness modulation signal for said single cathode-ray tube.

4. A device according to claim 1, in which means is provided to regulate the scanning position of said irradiating beam during the scanning of at least one of said scanned regions.

5. A device according to claim 1, in which the number of said scanned regions is two from each of which two informations are derived, said display means includes two cathode-ray tubes, said two informations derived from one of said scanned regions being utilized as a brightness modulation signal for one of said cathode-ray tubes, while said two informations derived from the other of said scanned regions being utilized as a brightness modulation signal for the other cathode-ray tube.

6. A device according to claim 2, in which said two informations are of the same nature.

7. A device according to claim 3, in which said two informations are of the same nature.

8. A device according to claim 3, in which said two informations are of different nature.

9. A device according to claim 5, in which one of said former two informations derived from one of said scanned regions is of the same nature as one of said latter two informations derived from the other of said scanned regions, and the other of said former two informations derived from one of said scanned regions is also of the same nature as the other said latter two informations derived from the other of said scanned regions.

10. A device for displaying a plurality of images of an object comprising oscillator means for generating a plurality of sets of deflecting saw-tooth waves of different magnitudes each including a horizontal deflection saw-tooth wave and a vertical deflection saw-tooth wave, means for deflecting an electron beam to be directed toward the object, switch means for alternately supplying said sets of deflecting saw-tooth waves to said deflecting means at a predetermined time interval, means for detecting a plurality of informations derived from the object as a result of the irradiation of the object with said electron beam, a plurality of cathode-ray tubes the deflecting coils of each of which are supplied with at least one set of said deflecting saw-tooth waves, and switching means for alternately supplying said informations to said cathode-ray tubes as a brightness modulation signal in synchronism with the switching operation by said first-mentioned switching means.

11. A device according to claim 10, in which the respective numbers of said sets of deflecting saw-tooth waves said cathode-ray tubes, and said informations are two, and one of said informations is utilized as a brightness modulation signal for one of said cathode-ray tubes while the other said information is utilized as a brightness modulation signal for the other said cathode-ray tube.

12. A device according to claim 10, in which means are provided to suitably control the biasing of at least one of said sets of deflecting saw-tooth waves to be supplied to said deflecting means.

13. A device according to claim 10, in which said informations are of the same nature.

14. A device for displaying a plurality of images of an object comprising oscillator means for generating a plurality of sets of deflecting saw-tooth waves of different magnitudes each including a horizontal deflection saw-tooth wave and a vertical deflection saw-tooth wave, means for deflecting an electron beam of electrons to be directed toward the object, switching means for alternately supplying said sets of deflecting saw-tooth waves to said deflecting means at a predetermined time interval, means for detecting a plurality of informations derived from the object as a result of the irradiation of the object with said electron beam, a single cathode-ray tube the deflecting coils of which are supplied with at least one of said sets of deflecting saw-tooth waves, switching means for alternately supplying said informations to said cathode-ray tube as a brightness modulation signal in synchronism with the switching operation by said first-mentioned switching means, and means for varying the regions being scanned by the electron beam in said cathode-ray tube in synchronism with the switching operation by said second-mentioned switching means.

15. A device according to claim 14, in which the numbers of said sets of deflecting saw-tooth waves and said informations are two.

16. A device according to claim 14, in which means are provided to suitably control the biasing of at least one of said sets of deflecting saw-tooth waves to be supplied to said deflecting means.

17. A device according to claim 14, in which said informations are of the same nature.

18. A device according to claim 14, in which said informations are of different nature.

19. A device for dispaying a plurality of images of an object comprising oscillator means for generating two sets of deflecting saw-tooth waves of different magnitudes each including a horizontal deflection saw-tooth wave and a vertical deflection saw-tooth wave, means for deflecting a beam of electrons to be directed toward the object, switching means for alternately supplying said two sets of deflecting saw-tooth waves to said deflecting means in synchronism with the periods of the horizontal deflection saw-tooth wave and the vertical deflection saw-tooth wave included in said sets of deflecting saw-tooth waves, means for detecting four informations derived from the object as a result of the irradiation of the object with said electron beam, two cathode-ray tubes the deflecting coils of each of which are supplied with at least one of said sets of deflecting saw-tooth waves, switching means for alternately supplying said informations to said cathode-ray tubes as a brightness modulation signal in synchronism with the switching operation by said first-mentioned switching means, and means for varying the regions being scanned by the electron beams in said two cathode-ray tubes in synchronism with the period of the horizontal deflection saw-tooth wave included in said set of deflecting saw-tooth waves.

20. A device according to claim 19, in which a means is provided to suitably control the biasing of at least one of said two sets of deflecting saw-tooth waves to be supplied to said deflecting means.

21. A device according to claim 19, in which two of said four informations are supplied to one of said cathode-ray tubes while the remaining two are supplied to the other said cathode-ray tube as a part of said former two informations, and said former two informations are of different nature.

22. A device for displaying a plurality of images of an object comprising oscillator means for generating two sets of deflecting saw-tooth waves of different magnitudes each including a horizontal deflection saw-tooth wave and a vertical deflection saw-tooth wave, means for deflecting a beam of electrons to be directed toward the object, switching means for alternately supplying said two sets of deflecting saw-tooth waves to said deflecting means at a predetermined time interval, means for detecting four informations derived from the object as a result of the irradiation of the object with said electron beam, two cathode-ray tubes the deflecting coils of each of which are supplied with at least one of said sets of deflecting saw-tooth waves, switching means for alternately supplying said informations to said cathode-ray tubes as a brightness modulation signal at the operating period and at half the operating period of said first-mentioned switching means, and means for suitably controlling the biasing of at least one of said two sets of deflecting saw-tooth waves supplied to said deflecting means, two of said four informations being supplied to one of said cathode-ray tubes while the remaining two being supplied to the other said cathode-ray tube so that said latter two informations represents a part of one of said former two informations, said former two informations being of different nature while one of the former two informations and one of the latter two informations being of the same nature and the other of the former informations and the other of the latter informations being also of the same nature.

23. A device according to claim 9, in which a part of one of said scanned regions from which said former two informations are derived is different from said scanned regions from which said latter two informations are derived.

References Cited

UNITED STATES PATENTS

| | | | |
|---|---|---|---|
| 3,235,727 | 2/1966 | Shapiro | 250—49.5 |
| 3,309,519 | 3/1967 | Euler et al. | 250—60 |

RALPH G. NILSON, Primary Examiner

C. E. CHURCH, Assistant Examiner